(12) United States Patent
Yoshida et al.

(10) Patent No.: US 8,209,326 B2
(45) Date of Patent: Jun. 26, 2012

(54) INFORMATION SYSTEM, METHOD, DEVICE AND METHOD PROVIDING SYSTEM FOR CONVEYING PREDETERMINED INFORMATION AS COMMENT DATA

(75) Inventors: Kazushi Yoshida, Kanagawa (JP); Hiroto Narioka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/176,514

(22) Filed: Jul. 5, 2011

(65) Prior Publication Data

US 2011/0264734 A1    Oct. 27, 2011

Related U.S. Application Data

(63) Continuation of application No. 11/775,658, filed on Jul. 10, 2007, now Pat. No. 7,987,183, which is a continuation of application No. 10/612,967, filed on Jul. 7, 2003, now abandoned, which is a continuation of application No. 09/568,999, filed on May 11, 2000, now abandoned.

(30) Foreign Application Priority Data

May 19, 1999   (JP) .................................... 11-139265

(51) Int. Cl.
G06F 17/00       (2006.01)
G06F 17/30       (2006.01)

(52) U.S. Cl. ......... 707/722; 707/725; 707/732; 707/769
(58) Field of Classification Search .................. None
See application file for complete search history.

(56) References Cited

U.S. PATENT DOCUMENTS 5,611,048 A    3/1997 Jacobs et al.
(Continued)

FOREIGN PATENT DOCUMENTS

EP            0945706           9/1999
(Continued)

OTHER PUBLICATIONS

Leong Keong Kwoh, "A catalog-browse system with quick-look images for SPOT, ERS and RADARSAT Data archives", IEEE 1997 pp. 1257-1259.

(Continued)

*Primary Examiner* — Jay Morrison
(74) *Attorney, Agent, or Firm* — Oblon, Spivak, McClelland, Maier & Neustadt, L.L.P.

(57) ABSTRACT

An information providing device for providing various provide information formed with the predetermined format responding to a transfer request, and the information receiving system comprised of information processing device for receiving the provide information to be transmitted from the information providing device via the predetermined network and conducting information processing; the information providing device forms provide information by describing the comment data with the format readable by the information processing device in the comment area set with the format according to the predetermined program of the provider side, the information processing device receives the provided information to be transmitted via the network, and analyzing this according to the predetermined analyzing program, reads out the comment data of comment area, and delivers the comment data to the predetermined application software and conducts the predetermined information processing according to the application software.

18 Claims, 14 Drawing Sheets

U.S. PATENT DOCUMENTS

| | | | |
|---|---|---|---|
| 5,742,768 A | 4/1998 | Gennaro et al. | |
| 5,847,708 A | 12/1998 | Wolff | |
| 5,859,972 A | 1/1999 | Subramaniam et al. | |
| 5,974,445 A | 10/1999 | Pivnichny et al. | |
| 6,009,429 A | 12/1999 | Greer et al. | |
| 6,009,441 A | 12/1999 | Mathieu et al. | |
| 6,035,330 A | 3/2000 | Astiz et al. | |
| 6,061,692 A | 5/2000 | Thomas et al. | |
| 6,067,502 A | 5/2000 | Hayashida et al. | |
| 6,067,552 A | 5/2000 | Yu | |
| 6,115,626 A * | 9/2000 | Whayne et al. | 600/427 |
| 6,125,352 A | 9/2000 | Franklin et al. | |
| 6,134,591 A | 10/2000 | Nickles | |
| 6,233,600 B1 | 5/2001 | Salas et al. | |
| 6,249,773 B1 | 6/2001 | Allard et al. | |
| 6,310,601 B1 | 10/2001 | Moore et al. | |
| 6,317,759 B1 | 11/2001 | Osmond | |
| 6,340,977 B1 | 1/2002 | Lui et al. | |
| 6,351,777 B1 | 2/2002 | Simonoff | |
| 6,393,468 B1 | 5/2002 | McGee | |
| 6,459,499 B1 | 10/2002 | Tomat | |
| 6,487,457 B1 | 11/2002 | Hull et al. | |
| 6,507,845 B1 | 1/2003 | Cohen et al. | |
| 7,047,131 B2 | 5/2006 | Yoon et al. | |

FOREIGN PATENT DOCUMENTS

| | | |
|---|---|---|
| EP | 1205859 | 5/2002 |
| JP | 11-39329 | 2/1999 |
| JP | 11-53278 | 2/1999 |
| JP | 11-101653 | 4/1999 |

OTHER PUBLICATIONS

Skiles, J.W. et al. "Using the world wide web for distributed learning: two examples", IGARSS'97 remote sensing—A scientific vision for substaninable development, Geoscience and remote sensing, 1997, vol. 2, pp. 957-959.

U.S. Appl. No. 60/100,159, filed Sep. 14, 1998.

U.S. Appl. No. 60/119,928, filed Feb. 12, 1999.

Mavraganis Y., Maragoudakis Y., Pappas N., Kyriakaki G., The SICMA multimedia server and the virtual museum application, Proceedings of the European Conference on Multimedia Applications Services and Techniques—ECMAST 98, Berlin, Mar. 1998.

A Tool for the Rapid Authoring of Interactive Web Applications, by Jocelyn Paine, University of Oxford, Computers in Higher Education, vol. 11, Issue 2, 1997.

* cited by examiner

DATA CONSTRUCTION OF HTML FILE FORMED BY WWW SERVER DISPLAY DATA DESCRIBING AREA R1

OBJECT TAG DESCRIBING AREA R2
```
<OBJECT CODEBASE="http://www.xxxx.or.jp/" CLASSID="CLASID:
11111111-2222-3333-4444-000000000000">
</OBJECT>
```

COMMENT TAG DESCRIBING AREA R3
```
<!-- $$NAVIN' YO-USER'S-POINT-1.0.0$$
ID=SONNY
NAME="ROUMEN KAMAKURA"
POSITION=127522830:502585147
ZIP=232
ADDRESS="1-23 TORI-MACHI, MINAMI-KU, YOKOHAMA
TEL=045-123-4567
FAX=045-123-4568
URL=
E-Mail=
IMAGE=http://www.xxxx.or.jp/0013-3441.jpg
OPENTM="11 A.M. TO 3 A.M.
TITLE="KANTO-STYLE TONKOTSU ROUMEN"
COMMENT"SOUP IS KANTO STYLE TONKOTSU TASTE. VERY POPULAR
        AMONG WOMEN SINCE THE SOUP IS VERY RICH BUT NOT
        REMAIN IN THE MOUTH. ITS SECRET IS OIL. GENERALLY
        PORK IS USED BUT WE, KAMAKURA, USE CHICKEN. WE WILL
        OFFER A NEW MENU, FLAVORED WITH SPECIAL KAMAKURA
        SAUCE, FROM MAY. PLEASE TRY AND ENJOY POPULAR "JAHMEN"!!
CLOSED="EVERY MONDAY"
CATEGORY CODE=1
SITED=6ECC1BE0-DAE2-11D2-90FB-0000F4AA36FA
-->
```

FIG. 12

INFORMATION SYSTEM, METHOD, DEVICE AND METHOD PROVIDING SYSTEM FOR CONVEYING PREDETERMINED INFORMATION AS COMMENT DATA

CROSS-REFERENCE TO RELATED APPLICATION

This application is a continuation application of U.S. patent application Ser. No. 11/775,658, filed Jul. 10, 2007, which is a continuation of U.S. patent application Ser. No. 10/612,967, filed Jul. 7, 2003, which is a continuation of U.S. patent application Ser. No. 09/568,999, filed May 11, 2000, which is claims priority to Japanese Patent Application No. 11-139265, filed May 19, 1999.

BACKGROUND OF THE INVENTION

1. Field of the Invention

The present invention relates to an information receiving system, information receiving method, information providing device, information providing method, information providing method providing medium, information processing device, information processing method and an information processing method providing medium, and more particularly, is suitably applied to the case of capturing the desired provide information automatically from the Web page on the Internet and handing it over to the application software risen on the personal computer and registering it, for example.

2. Description of the Related Art

Heretofore, in the computer network via Internet, there exist multiple World Wide Web (WWW) servers on the network. And the client can obtain the user-desired information by receiving the Web page provided by the WWW server.

More specifically, heretofore the point information regarding the specific place displayed on the Web page to be supplied from the WWW server has been captured into the client and registered and memorized connectioning to the map software risen on the client.

In this case, the WWW server side, after putting the point information including at least the latitude, longitude, address and telephone numbers in the file and memorizing these in the hard disc, describes hyperlink on the file using the hyper text markup language (HTML) and holds the file.

The client displays the Web page whenever downloading the HTML file and analyzing by the Web browser. And when an anchor on the Web page displayed is clicked by the user, the client downloads the file of point information hyperlinked from the server and analyzes, and as well as registering the point information on the map displayed by the map software risen by itself and memorizing, displays the Icon connected to the point information.

In practice, in the map database called as "map server" (a trademark) and its display program, hyperlink to file itself including the point information such as
<a href="/rdw1010/31.mps">script</a>
is described in the map server script.

Here, "/rdw1010/31.mps" in the HTML file shows the script "31.mps" existing in "rdw1010" directory of the server. Accordingly, when the "script" part marked up on the Web page is clicked, the client downloads the script "31.mps" and captures into the map software risen by itself.

However, in the WWW server of the computer network thus constructed, since all point information have to be put in file and stored in the hard disc, it has caused a problem that workload of the server has become large.

Moreover, since the client, after displaying the dialog, such as "execute download" once via the Web browser, downloads from Internet taking some communicating time corresponding to the volume of data when the anchor on the Web page is clicked, the processing time is required before registering the point information on the map displayed by the map software. And it created a problem that the registration processing of the point information could not be executed in real time.

SUMMARY OF THE INVENTION

In view of the foregoing, an object of this invention is to provide an information receiving system, an information receiving method, an information providing device, information providing method, an information providing method providing medium, an information processing method and an information processing method providing medium capable of receiving the provide information with further ease via network.

The foregoing object and other objects of the invention have been achieved by the provision of an information receiving system; in the case of transmitting various provide information formed with the predetermined format responding to the transfer request from the information providing device via the predetermined network and receiving the information by the information processing device and conducting the information processing, the information providing device forms provide information by describing the comment data readable by the information processing device in the comment area set by the format according to the program of the predetermined provider and transmits to the information processing device via the network. And the information processing device, receiving the provide information to be transmitted via the network, analyzes according to the predetermined analyzing program, and reading out the comment data described in the comment area, delivers it to the predetermined application software and conducts the predetermined information processing according to the application software.

Furthermore in the information receiving system and the information receiving method according to the present invention, since provide information formed by describing the comment data with the format readable by the information processing device into the scrip area is transmitted from the information providing device to the information processing device, the provide information received by the information processing device is analyzed according to the predetermined analyzing program, and the comment data described in the comment area is read out and handed over to the predetermined application software, and the predetermined information processing is conducted according to the application software, the information processing device can immediately obtain the comment data and can capture into the predetermined software just by reading out the comment data of the comment area described by the information providing device in advance from the provide information received without downloading from the information providing device.

Furthermore, according to the present invention, in the case of providing various provide information formed with the predetermined format to the information processing device connected via the predetermined network responding to the transfer request from the information processing device, the provide information will be formed by describing the comment data with the format that the information processing device can read, into the comment area set by the format according to the program of the predetermined provider side and the information will be transmitted to the information processing device via the network.

In the information providing device and the information providing method according to the present invention, since provide information will be formed by describing the comment data with the format readable by the information processing device into the comment area set with the predetermined format and the provide information will be transmitted to the information processing device via the network, the information processing device can obtain the comment data immediately and capture into the predetermined application software just by reading out the comment data of the comment area described by the information providing device from the provide information received without downloading from the information providing device.

Furthermore, according to the present invention, in the information providing method providing medium in which programs for supplying various provide information formed with the predetermined format to the information processing device connected via the predetermined network responding to the transfer request from the information processing device, makes the information providing device execute the programs, comprising the steps of; forming providing information by describing the comment data with the format readable by the information processing device in the comment area set with the format according to the predetermined programs of the provider side and transmitting the provide information formed by the step of forming information to the information processing device via the network.

Since the information providing device forms provide information by describing the comment data with the format readable by the information processing device in the comment area set with the predetermined format according to the program memorized in the information providing method providing medium and by transmitting the provide information to the information processing device via the network, the information processing device can immediately obtain the comment data and capture into the predetermined application software by just reading out the comment data of the comment area described by the information providing device in advance from the provide information received without downloading from the information providing device.

Furthermore, according to the present invention, various provide information formed with the predetermined format are transmitted from the information providing device responding to the transfer request via the predetermined network and in the case of receiving the transmitted provide information and conducting the information processing, the provide information formed by describing the comment data of readable format in the comment area set with the format will be received via the network, the received information will be analyzed according to the predetermined analyzing program, the comment data described in the comment area will be read out, the comment data read out will be handed over to the predetermined application software, and the predetermined information processing will be conducted according to the application software.

In the information processing device and the information processing method according to the present invention, since provide information in which comment data of readable format is described in the comment area set with the predetermined format will be received from the information providing device, the comment data of the comment area is read out from the provide information received and handed over to the predetermined application software and the predetermined information processing will be conducted according to the application software, the comment data can be obtained immediately and captured into the predetermined application software by just reading out the comment data of the comment area described by the information providing device in advance from the provide information received without downloading from the information providing device.

Furthermore, according to the present invention, in the information processing method providing medium in which programs for transmitting various information formed with the predetermined format from the information providing device responding to the transfer request via the predetermined network and for receiving the transmitted information and conducting the information processing are memorized, and makes the information processing device execute the programs, comprising the steps of; receiving provide information formed by describing the comment data with readable format in the comment area set with the format via network, analyzing the provide information received by the step of receiving according to the analyzing program and reading out the comment data described in the comment area, and controlling for delivering the comment data read out by the step of analyzing to the predetermined application software and for conducting the predetermined information processing according to the application software.

According to the program memorized in the information processing method providing medium, the information processing device receives provide information formed by describing the comment data with readable format in the comment area set with the predetermined format via the network and analyzes these according to the predetermined analyzing program, and reading out the comment data described in the comment area, hands it over to the predetermined application software and conducts the predetermined information processing according to the application software. Thus, the information processing device can immediately obtain the comment data just by reading the comment data of the comment area described by the information providing device in advance from the provide information received without conducting download from the information providing device and can capture into the predetermined application software.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 12 is a brief linear diagram showing the data construction of the HTML file formed by the WWW server;

DETAILED DESCRIPTION OF THE EMBODIMENT

Preferred embodiments of this invention will be described with reference to the accompanying drawings:

(1) General Construction of Map Information Receiving System

Figure 1:
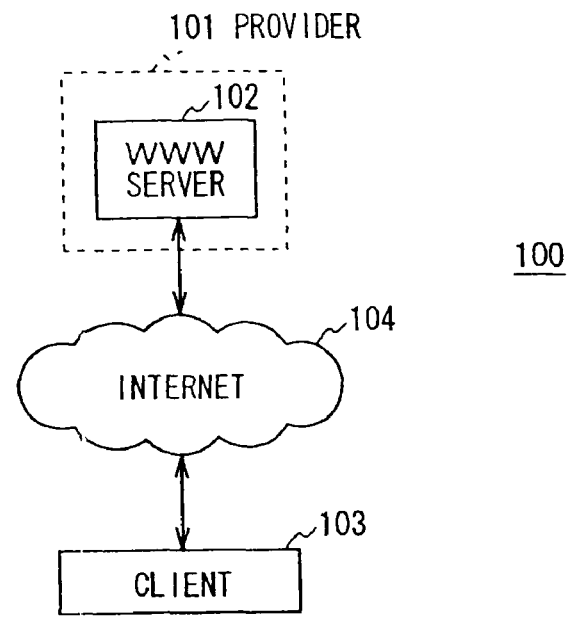
FIG. 1 is a brief linear block diagram showing the construction of a point information receiving system according to the present invention.

In FIG. 1, 100 generally shows a point information receiving system as the information receiving system according to the present invention. The World Wide Web (WWW) server 102 as the information providing device possessed by the Internet service provider (hereinafter referred to as provider) 101 and the client 103 as the information processing device are connected via Internet 104, and hyper text markup language (HTML) file to be supplied from the WWW server 3 will be received by the client 4 and being analyzed by the World Wide Web (WWW) browser, the Web page will be displayed on the screen.

(2) Construction of WWW Server

Figure 2:
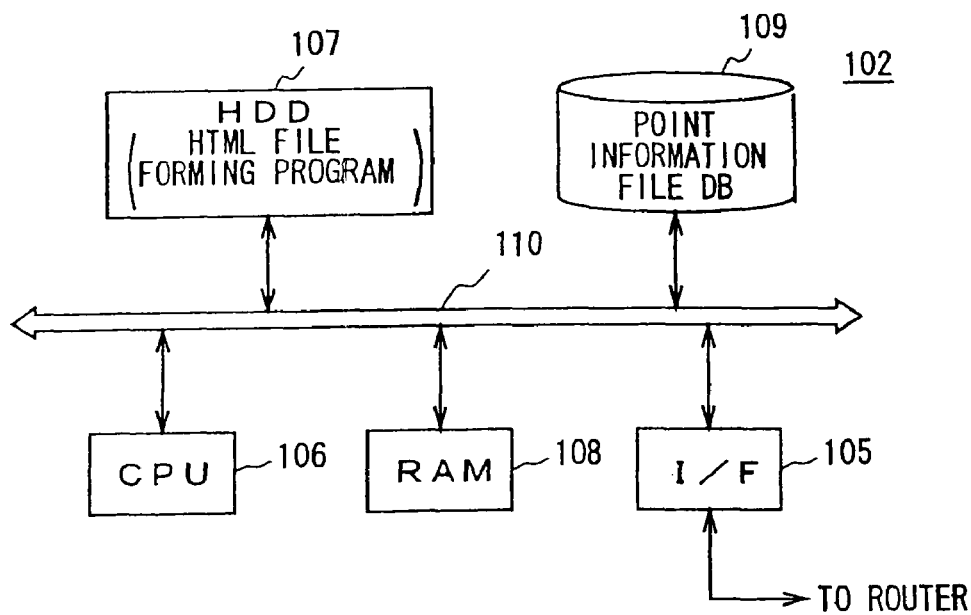
FIG. 2 is a block diagram showing the construction of the WWW server of the point information receiving system.

As shown in FIG. 2, the WWW server 102 is connected to Internet 104 via a router, and central processing unit (CPU) 106 receives a transfer request of the Web page on the specific point information from the client 103 via an interface 105 and a bus 110.

The CPU 106, reading out the HTML file forming program stored in the hard disc drive (HDD), rises it on the RAM 108, and after retrieving and reading out the specific point information file from the point information file database 109 according to the HTML file forming program, forms the HTML file based on the point information and transmits this to the client 103 via the interface 105 and the router.

More specifically, when the transfer request of the point information is received from the client 103, the WWW server 102 reads out the specific information file from the point information file database 109 using common gateway interface (CGI) from that point and forms HTML file dynamically. Thus, it is unnecessary to form and memorize the HTML file on the specific point information in advance.

Accordingly, since it is not required for the WWW server 102 to form and hold the HTML file on all point information in advance, such as memory device to hold the HTML file becomes unnecessary and workload of the server itself will be decreased.

(3) Construction of Client

Next, the construction of the client 103 in the point information receiving system 100 will be explained in the following paragraphs.

(3-1) External Construction of Client

Figure 3:
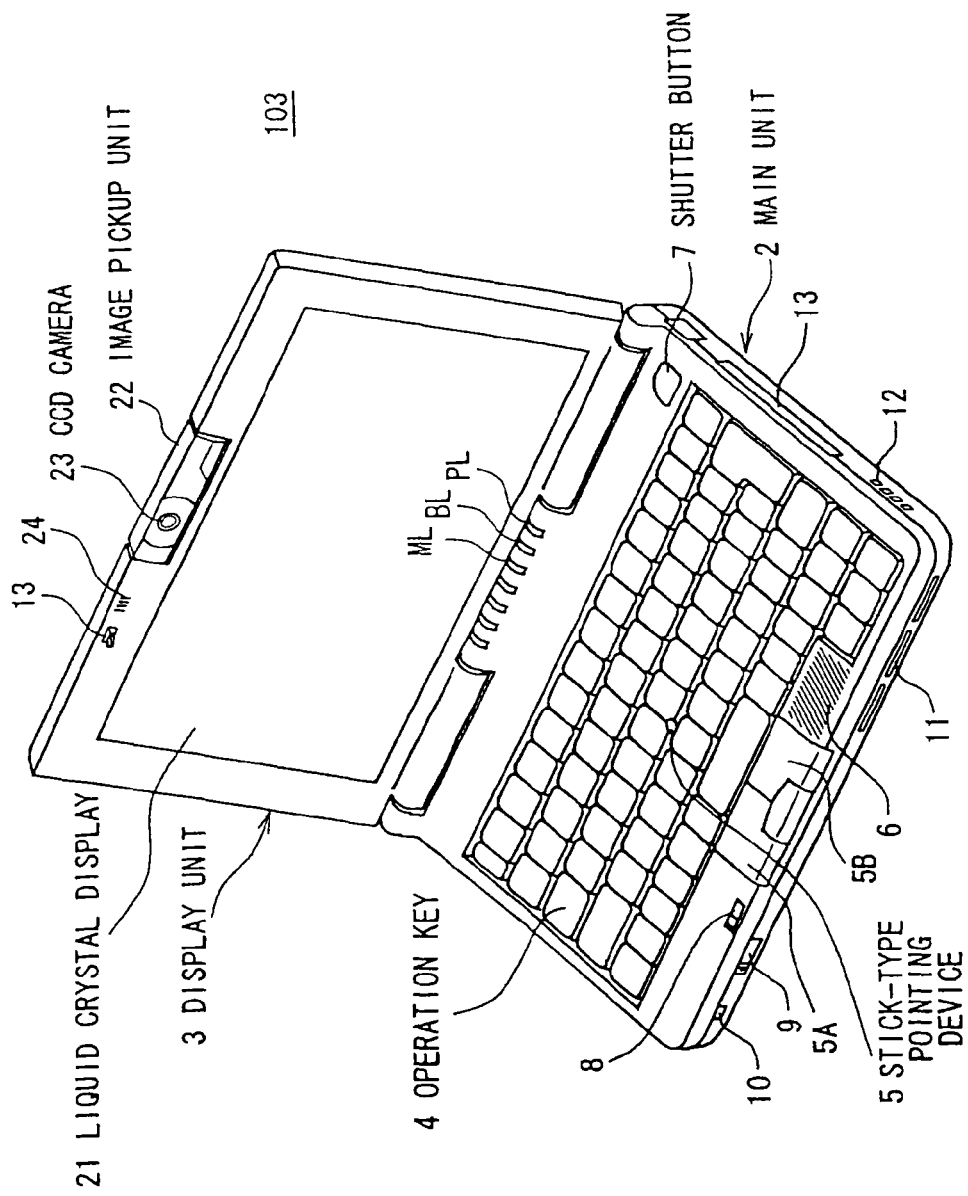
FIG. 3 is a brief linear perspective view showing the external construction of a client of the point information receiving system.

As shown in FIG. 3, the client 103 is formed of a portable personal computer device, smaller than B-5 size, and comprises a main body 2 and a display unit 3 attached open/close free to the main body 2.

The main body 2 is equipped with multiple operation keys 4 for inputting various characters, symbols and numbers, a stick type pointing device 5 to operate when moving the cursor to be input displayed on the display unit 3, a build-in speaker 6, a shutter button 7 to operate when shooting images by the charge coupled device (CCD) camera 23 provided in the display unit 3.

In front of the display unit 3, a liquid crystal display (LCD) 21 is provided and an image pickup unit 22 equipped with a CCD camera 23 attached to the display unit 3 rotation free at the front center upper edge part.

Figure 4:
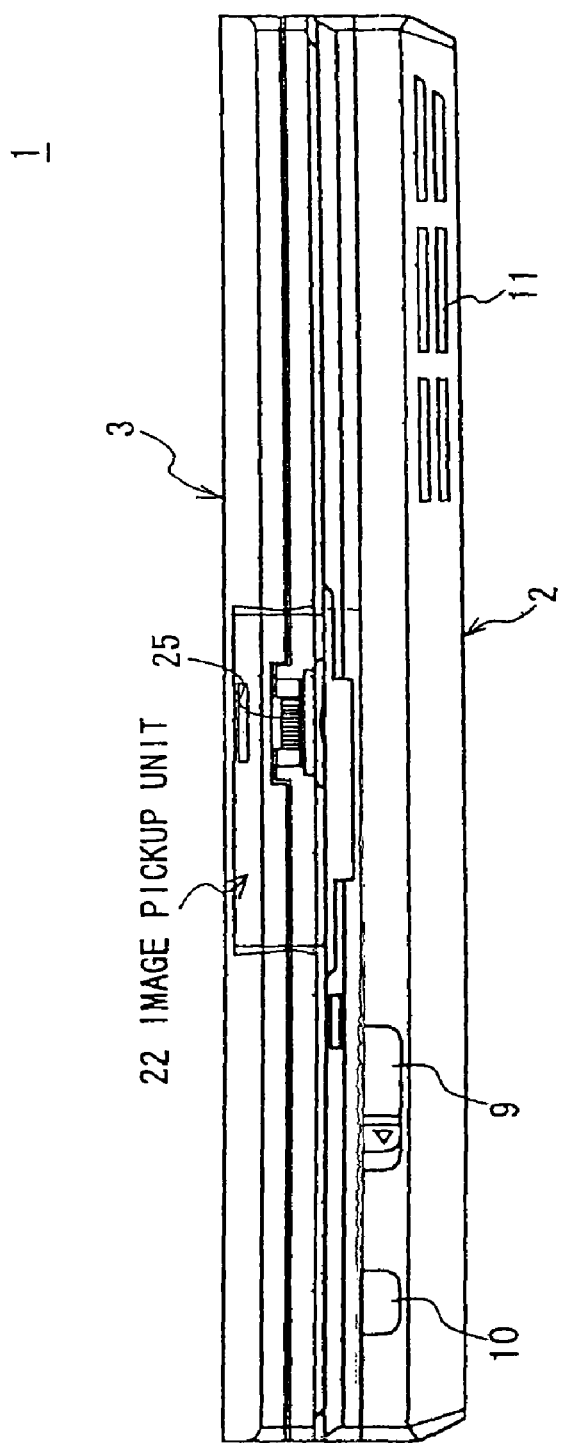
FIG. 4 is a brief linear sketch showing the front construction of the main unit.
Figure 5:
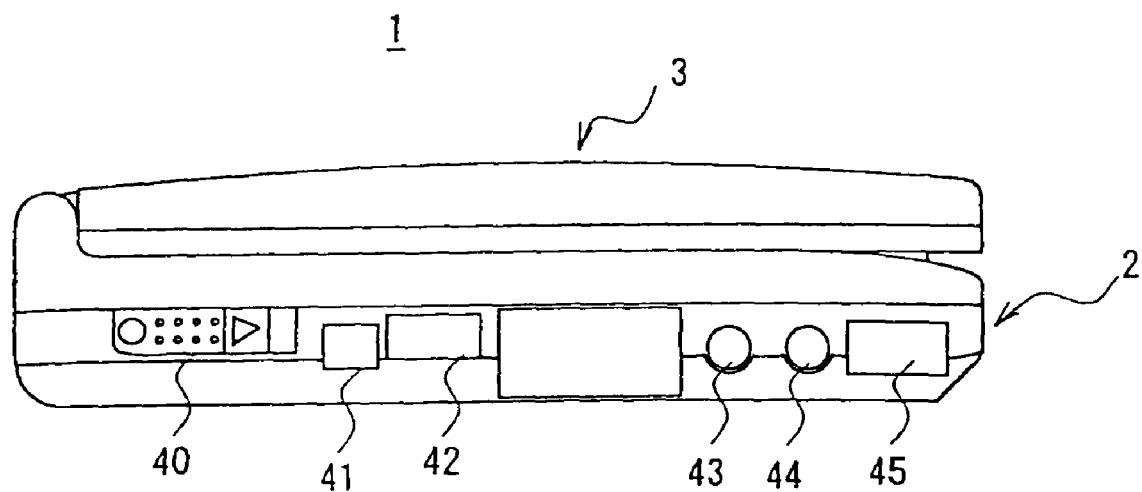
FIG. 5 is a left side sketch showing the state in which the display unit is closed to the main unit.

More specifically, the image pick-up unit 22 can conduct the positioning to the optional position by rotating within the angle range of 180° between the front direction and rear direction of the display unit 3. Moreover, as shown in FIG. 4, an adjusting ring 25 to conduct the focus adjustment of the CCD camera 23 is provided in the image pick-up unit 22.

Furthermore, in front of the display unit 3 (FIG. 3) a microphone 24 is provided on the left side of the image pick-up unit 22, and sounds can be also obtained from the back side (FIG. 7) of the display unit 3 via the microphone 24.

Furthermore, at the lower edge center part of the front surface in the display unit 3, a power source lamp PL formed of light emitting diode (LED), a buttery lamp BL, a message lamp ML and other lamps corresponding to various other uses are provided.

Furthermore, at the upper center part of the display unit 3, a hook 13 is provided on the left side of the microphone 24, and a hole 8 is provided on the predetermined position of the main unit 2 corresponding to the hook 13. And when the display unit 3 is closed covering the main unit 2, the hook 13 is connected to the hole 8 and locked.

As shown in FIG. 4, a slide lever 9 is provided in front of the main unit 2. And by sliding the slide lever 9 in the direction shown by an arrow along the front, locked condition of the hook 13 connected with the hole 8 will be released and the display unit 3 can be opened with respect to the main unit 2.

Furthermore, in front of the main unit 2, a programmable power key (PPK key) 10 for putting the electric source on and rising the predetermined application software (hereinafter referred to as application) by only one button operation and for executing a series of operations preset is provided at the left edge part, and multiple air aspiration holes 11 are provided at the right edge part.

Figure 6:
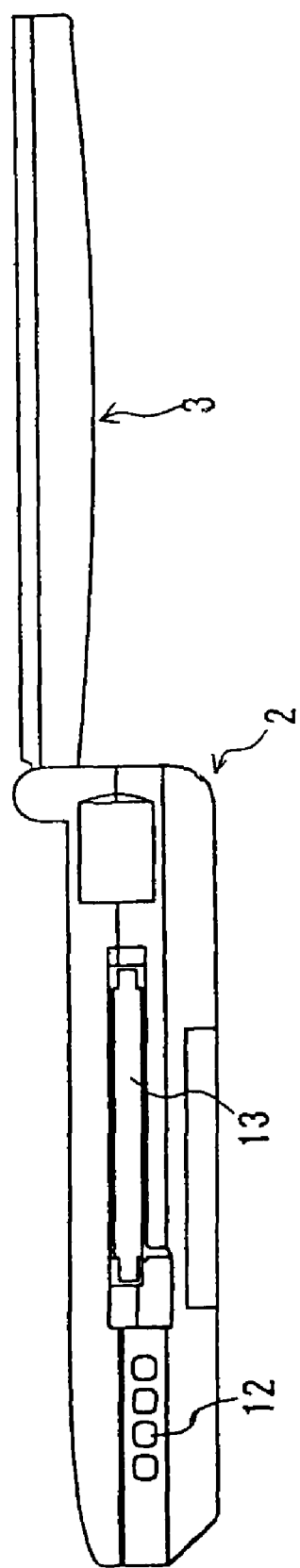
FIG. 6 is a right side sketch showing the state in which the display unit is opened 180 degree to the main unit.

On the left side surface of the main unit 2, as shown in FIG. 6, a sliding type electric source switch 40, a 4-pin compatible Institute of Electrical and Electronics Engineers (IEEE) 1394 terminal 41, universal serial bus (USB) terminal 42, a microphone input terminal 43, a headphone terminal 44 and an infrared port 45 compliant with the infrared data association (IrDA) are provided.

On the right side surface of the main unit 2, as shown in FIG. 6, an air exhausting hole 12 is provided. And a PC card slot 13 for inserting personal computer memory card international association (PCMCIA) card (hereinafter referred to as PC card) is provided on the right side of the air exhausting hole 12.

Figure 7:
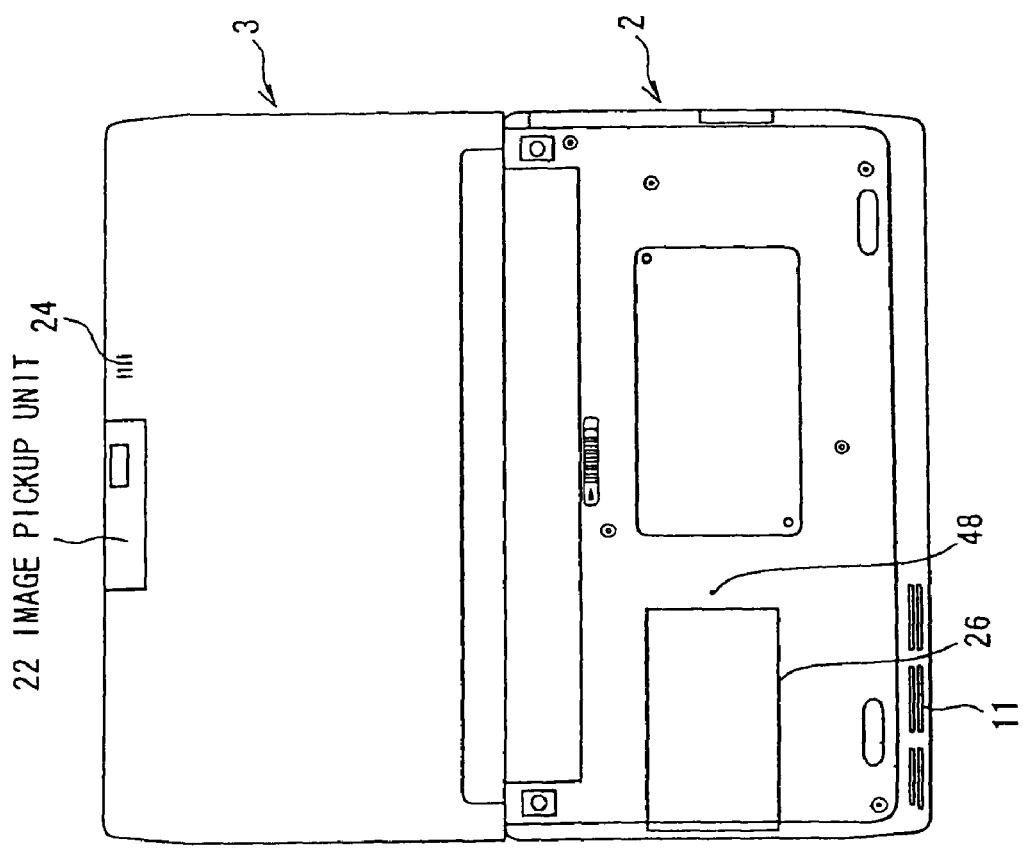
FIG. 7 is a sketch showing the construction of bottom surface of the main unit.

Moreover, on the bottom surface of the main unit 2, as shown in FIG. 7, a cover 26 to cover the opening 25 for attaching an expansion memory and a hook inserting hole 48 for releasing the locking hook of the cover 26 are provided.

(3-2) Circuit Construction of Client

Figure 8:
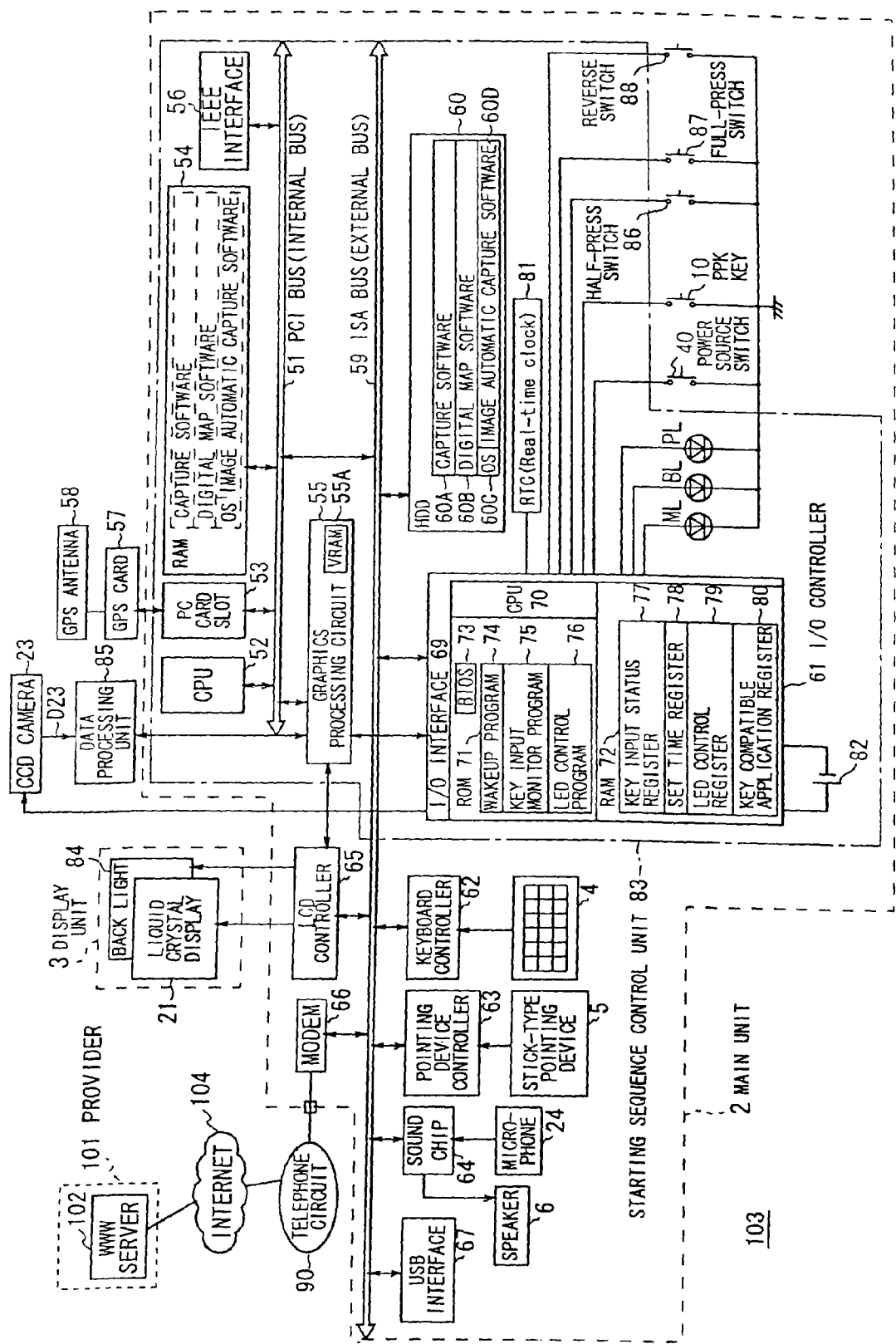
FIG. 8 is a block diagram showing the circuit construction of client.

As shown in FIG. 8, in the main unit 2 of the client 103, a central processing unit (CPU) 52, a personal computer (PC) card slot 13, random access memory (RAM) 54, a graphics processing circuit 55 for forming images to be displayed on the liquid crystal display 21 of the display unit 3, and an IEEE interface 56 connected to the IEEE1394 terminal 41 for inputting digital data connecting to other computer devices and external equipments are connected to a peripheral component interconnect (PCI) bus 51 of the starting sequence control unit 83.

The CPU 52 is a controller to generally control various functions of the main unit 2, and it can execute various functions by executing various programs loaded on the RAM 54.

The PCI bus 51 is connected to an industrial standard architecture (ISA) bus 59, and a hard disc drive 60, In/Out (I/O) controller 61, a keyboard controller 62, a pointing device controller 63, a sound chip 64, a LCD controller 65, a modem 66 and USB interface 67 are connected to the ISA bus 59.

At this point, the keyboard controller 62 controls the input of control signal according to pressing down the operation key 4 (FIG. 3). And the pointing device controller 63 controls the input of control signal by the stick type pointing device 5 (FIG. 3).

Furthermore, the sound chip 64 captures sound input from the microphone 24 (FIG. 3) or supplies sound signal to a built-in speaker 6 (FIG. 3). The modem 66 is connected to the WWW server 102 of the provider 101 via the public telephone circuit 90 and Internet 104. In this connection, the USB interface 67 is connected to the USB terminal 42 and connects the peripheral equipments such as the USB mouse and the floppy disk drive.

In the hard disc drive 60, a capture software 60A, a digital map software 60B and an operating system (OS) 60C formed of Window 98 (trademark), and an image automatic capture software 60D to capture image data photographed by the CCD camera 23 automatically and various application softwares (not shown in Fig.) are stored in the hard disc drive 60 and will be read out by the CPU 52 as required and loaded on the RAM 54.

The I/O controller 61 comprises an I/O interface 69, a CPU 70, and a read only memory (ROM) 71 formed of electrically erasable and programmable read only memory (EEPROM) and a RAM 72 which are connected to each other, and the present time is constantly supplied by the Real-Time Clock (RTC) 81.

A basic input/output system (BIOS) 73, a wakeup program 74, a key input monitor program 75 and a LED control program 76 are stored in the ROM 71 of the I/O controller 61, and the RAM 72 is equipped with a key input status register 77, set time register 78, LED control register 79 and a key compatible application register 80.

The key input status register 77 stored in the RAM 72 can store the operation key flag, and the CPU 70 monitors whether the one-touch operation PPK key 10 (FIG. 4) is pressed or not based on the key input monitor program 75, and when the PPK key 10 is pressed down, the CPU 70 stores the operation key flag in the key input status register 77.

Furthermore, the setting time register 78 can store time information, the start time set optionally by the user in advance. And the CPU 70 detects whether the current time to be supplied from the RTC 81 becomes the optionally set start time or not based on the wakeup program 74 and when it becomes the start time, the CPU 70 executes the predetermined processing.

Furthermore, the key compatible application register 80 memorizes the relationship between the PPK key 10, the operation key 4 formed of multiple combinations and the application to be started corresponding to the PPK key 10 and the preset combination of operation key 4. And when the PPK key 10 or the preset combined operation key 4 is pressed, the CPU 70 transmits the control data for starting the pertinent application to the CPU 52 via the ISA bus 59 and the PCI bus 51, and the CPU 52 starts the application software according to the control data.

Furthermore, when the application software memorized in the key compatible application register 80 is started and the operation terminates, the LED control register 79 stores the end flag, and when the CPU 70 detects that the end flag is stored in the LED control register 79 based on the LED control program 76, it lights up the message lamp ML.

In this connection, when the power source switch 40 is pressed, the LED control register 79 stores a power source flag, and when the main unit 2 functions by the power source voltage to be supplied from the battery, the LED control register 79 stores battery flag. Accordingly, when the CPU 70 detects that the power source flag or the battery flag is stored based on the LED control program, it lights up the electric power source lamp PL and the battery lamp BL.

Here, since the backup battery 82 is connected to the I/O controller 61, each data of the key input status register 77, the setting time register 78, the LED control register 79 and the key-compatible application register 80 of the RAM 72 can be held even when the power source switch 40 of the main unit 2 is off condition and the electric power is not supplied from the power source (not shown in Fig.).

Furthermore, the reverse switch 88 connected to the I/O controller 61 is put ON when the image pick-up unit 22 (FIG. 3) is turned 180° in the direction of photographing the reversed side of the liquid crystal display 21 of the display unit 3, and informs the CPU 70 of this condition. Moreover, PPK key 10 also informs the CPU 70 of that condition as in the case when the reverse switch 88 is pressed.

Moreover, when the shutter button 7 provided on the upper surface of the main unit 2 is half-pressed, the half-press switch 86 is on and informs the CPU 70 of the I/O controller 61 of this condition. And when the shutter button 7 is full pressed, the full-press switch 87 is on and informs the CPU 70 of the I/O controller 61 of this condition.

More specifically, when the user presses the shutter button 7 and becomes half-pressed state under the condition in which the capture software 60A of the hard disc drive 60 is started, the CPU 70 of the I/O controller 61 enters the still picture mode, and executes freeze of the still picture by controlling the CCD camera 23. And when it becomes the full-pressed condition, the CPU 70 captures the frozen still image data and transmits this to the data processing unit 85.

On the other hand, when it enters the animated picture mode not rising the capture software 60A, the CPU 70 of the I/O controller 61 captures the animated pictures up to 60 seconds at the maximum and transmits this to the data processing unit 85.

Furthermore, the I/O controller 61 controls the graphics processing circuit 55 connected to the PCI bus 51. And after conducting the predetermined data processing to the image data formed of still picture or animated picture captured by the CCD camera 23 at the data processing unit 85, the I/O controller 61 enters this into the graphics processing circuit 55.

The graphics processing circuit 55, after storing the image data supplied in the built-in video random access memory (VRAM) 55A and reading it out as required, transmits to the LCD controller 65 and stores in the hard disc drive 60 as occasion demands.

The LCD controller 65, as well as controlling the back light 84 of the display unit 3 and lighting it up from behind the liquid crystal display 21, outputs image data supplied from the graphics processing circuit 55 to the liquid crystal display 21 and displays this on the display.

On the other hand, in the case where the digital map software 60B read out from the hard disc drive 60 is risen on the RAM 54, the CPU 52 transmits the map data based on the digital map software 60B to the graphics processing circuit 55.

At this point, the graphics processing circuit 55 forms map image data to display on the liquid crystal display 21 based on the map data supplied and stores in the VRAM 55A, and reading these out when required, transmits to the LCD controller 65.

With this arrangement, the LCD controller 65 displays the map picture onto the liquid crystal display 21 of the display unit 3 based on the map image data supplied from the graphics processing circuit 55.

Furthermore, the PC card slot 13 connected to the PCI bus 51 will be attached via the PC card (not shown in Fig.) as required when adding the optional function and to receive data from the CPU 52 via the PC card. For example, when PCMCIA type global positioning system (GPS) card 57 is attached to the PC card slot 13, radio waves from the GPS satellite will be received by the GPS antenna 58 connected to the GPS card 57 and the present positioning data can be obtained.

Thus, the GPS card 57 transmits the current positioning data (latitude data, longitude data and altitude data) received through the GPS antenna 58 to the CPU 52 via the PCI bus 51.

In this case, the CPU 52 transmits the present positioning data to the graphics processing circuit 55, and after forming an arrow mark Icon showing the present position based on the current positioning data by the graphics processing circuit 55, displays an arrow mark Icon overlapping onto the map image of the liquid crystal display 21 via the LCD controller 65.

With this arrangement, the liquid crystal display 21 can display the arrow mark ICON moving on the map image based on the positioning data detected by the GPS card 57.

(4) Automatic Capture of Point Information Specified by Web Page

Next, in the point information receiving system 100, the processing that automatically capturing the point information on the Web page supplied from the WWW server 102 to the client 103 into the digital map software 60B and registering will be described in detail in the following paragraphs.

Figure 9:
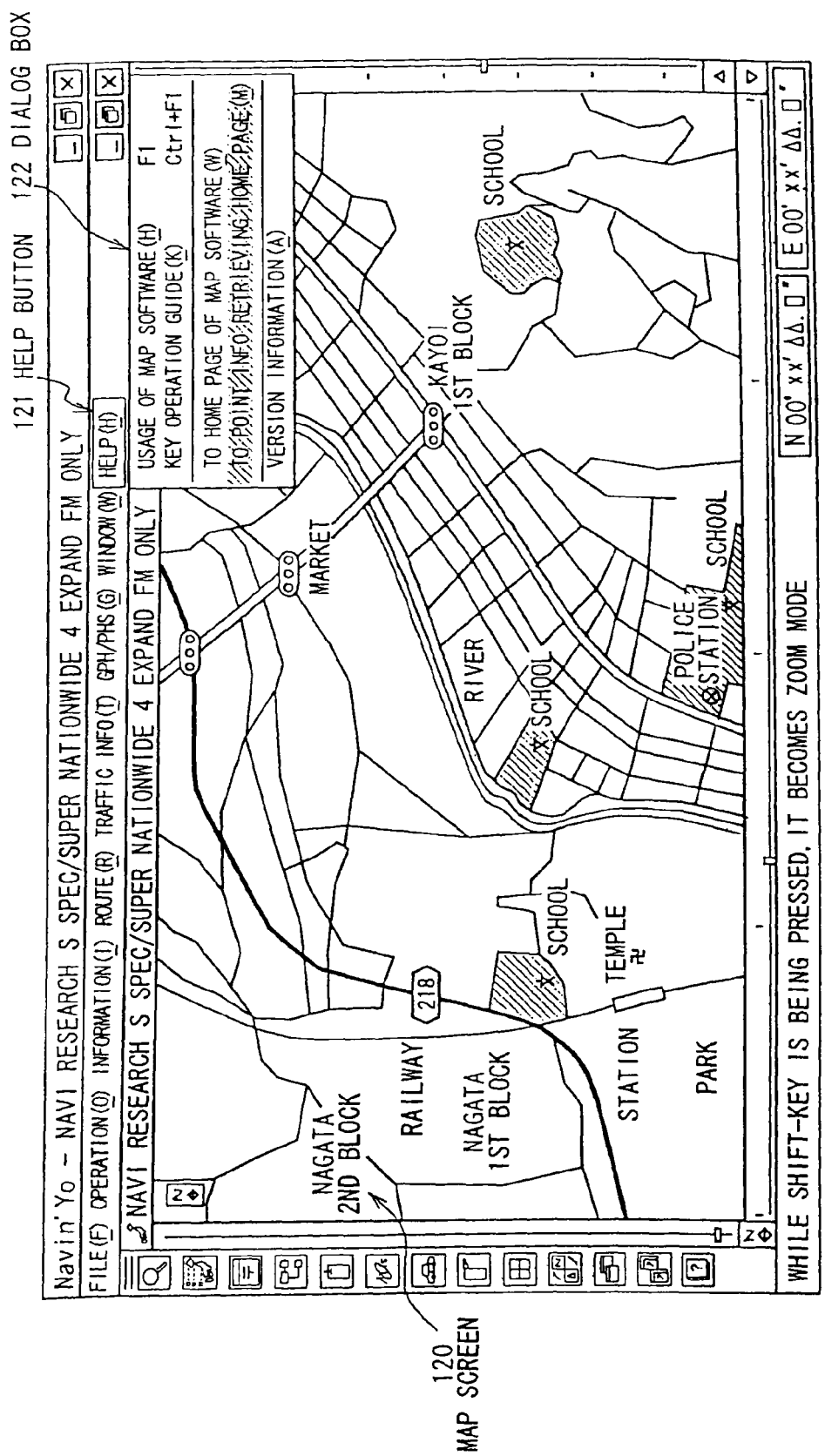
FIG. 9 is a brief linear diagram showing a map screen displayed on the liquid crystal display.

In practice, the client 103, by rising the digital map software 60B after reading it out from the hard disc drive 60 on the RAM 54 by the CPU 52 (FIG. 8), and controlling the graphics processing circuit 55 and the LCD controller 65, displays a map screen 120 as shown in FIG. 9 on the liquid crystal display 21 of the display unit 3. Here, the map of the user desired area selected is displayed.

If a help button 121 on the map screen 120 is selected by the user, the CPU 52 displays the predetermined dialog box 122 right below the help button 121. In this dialog box 122, in addition to the selection buttons for using the digital map software and key operation guide, the selection buttons of the digital map software home page and the point information detection home page to detect the point information are displayed.

Figure 10:
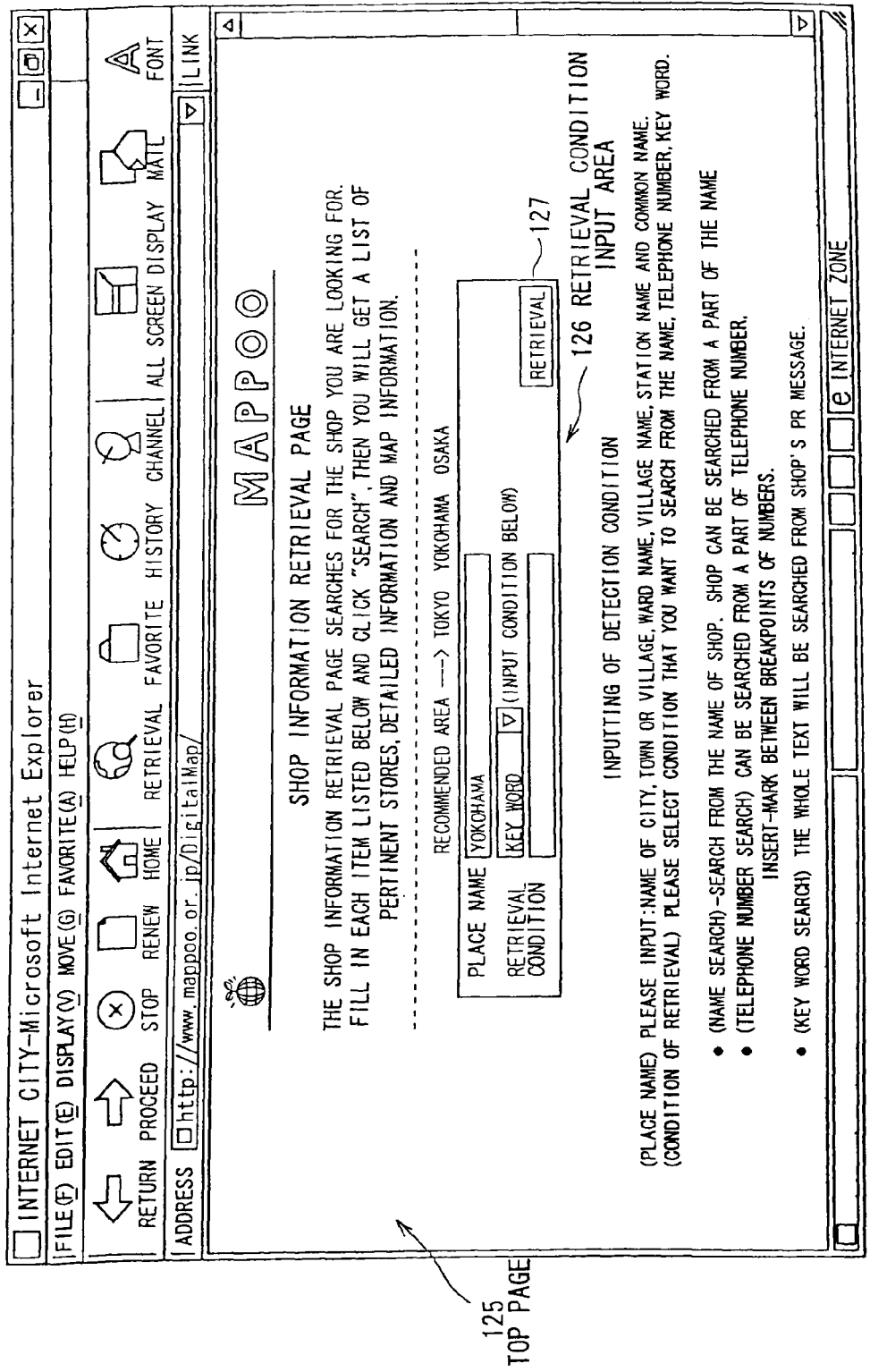
FIG. 10 is a brief linear diagram showing the top page of the point information retrieval home page.

If the selection button of point information detection home page is clicked from the dialog box 122 displayed on the map screen 120, the CPU 52 accesses to the WWW server 102 of the provider 101 via the telephone circuit 90 and Internet 104 by the modem 66, receives the point information detection home page, and displays the top page 125 of the point information detection home page on the liquid crystal display 21 as shown in FIG. 10.

In the top page 125 of the point information detection home page, the place name and key word for detecting the desired point information can be entered into the detection condition input area 126, and when the detection button 127 is clicked after the detection condition is entered by the user, the CPU 52 transmits the detection condition data to the WWW server 102 of the provider 101.

The WWW server 102 executes the detection processing based on the detection condition data supplied from the client 103 and returns the detection result to the client 103.

Figure 11:
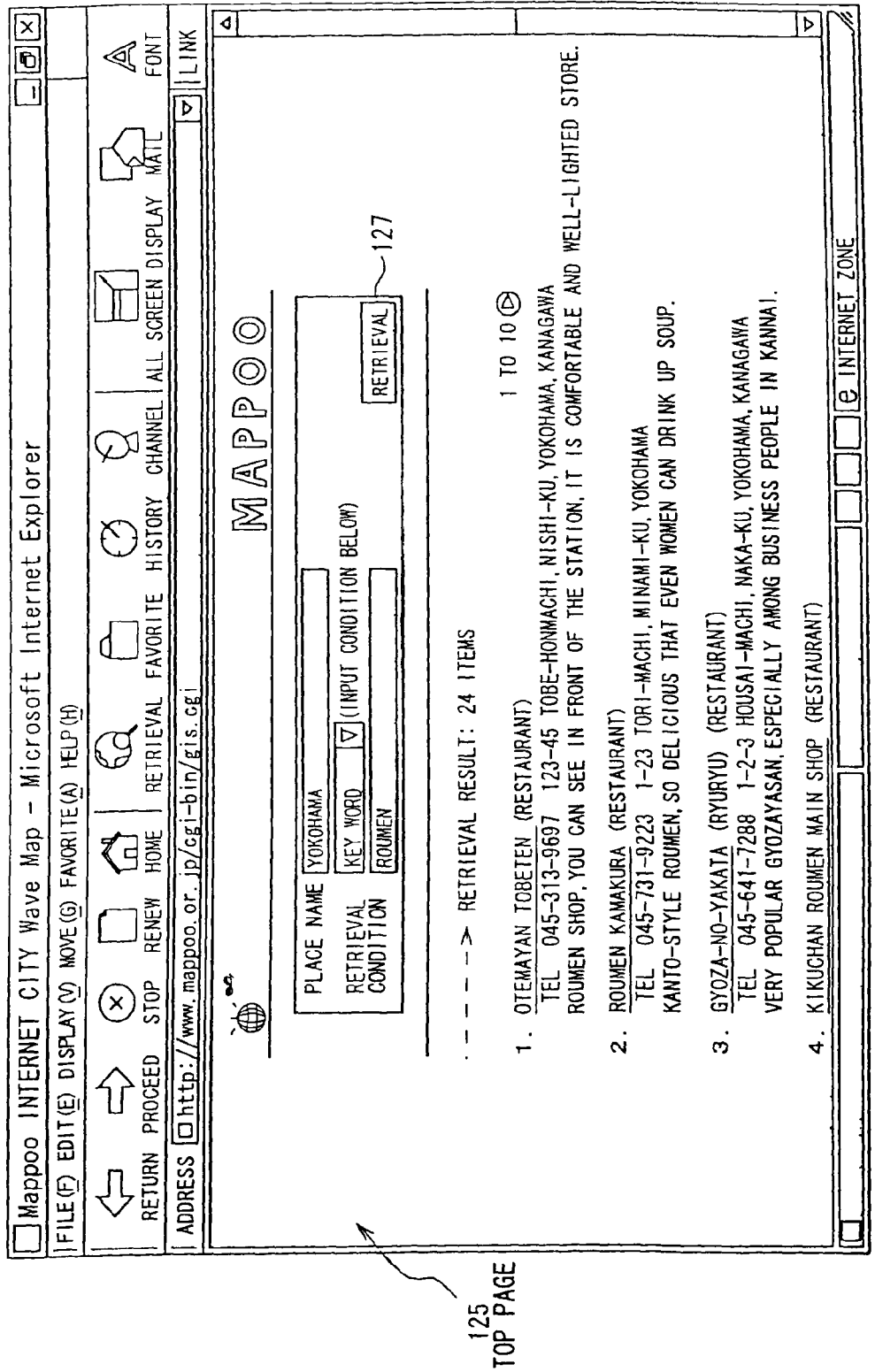
FIG. 11 is a brief linear diagram showing the display contents of the retrieval result screen.

The client 103, after receiving the detection result from the WWW server 102, displays the detection result screen 128 as shown in FIG. 11 on the liquid crystal display 21 by the control of the CPU 52. In this detection result screen 128, the plural number of Roumen shops corresponding to the detection condition input by the user (in this case, the place name is Yokohama City, and the key word is Roumen). And if the number 2 anchor "Roumen, Kamakura" is clicked from among these user desired shop names, the CPU 52 conducts the transfer request of the Web page showing detailed contents on the number 2 shop to the WWW server 102 of the provider 101.

Upon receiving the transfer request from the client 103, the WWW server 102 (FIG. 2) reads out the HTML file forming program of the hard disc drive 107, and reading out the point information file on the number 2 shop specified according to the HTML file forming program from the point information file database 109, forms HTML file actively and returns this to the client 103.

At this point, the data construction of the HYML file formed by the WWW server 102 will be described referring to FIG. 12. This HYML file is divided into the display data describing area R1, the object tag describing area R2 and the comment tag describing area R3.

In the display data describing area R1, display data regarding the point information showing the location and details of stores are described by the HTML tag and being analyzed by the WWW browser (Internet explorer (trademark)) attached to the OS (Window 98 (trademark)) 60C of the client 103 and displayed on the liquid crystal display 21 as the normal Web page.

The data to embed the auxiliary program to realize the processing that is difficult to conduct by the HTML on the WWW browser (such as ActiveX control (trademark) is described in the object tag describing area R2, and of these the start button of the auxiliary program (to be described later) corresponding to the class ID (CLASSID) will be displayed on the specified area of the Web page.

Here, the auxiliary program is arranged to start on the WWW browser of the client 103, and this is an object (program) installed in advance accompanied with the digital map software 60B stored in the hard disc of the hard disc drive 60.

The format that the CPU 52 of the client 103 can read out according to the supplemental program when the capture button displayed on the Web page is clicked, i.e., the point information using the HTML comment tag is described in the comment tag describing area R3. And here, contents are the same as those of the display data described in the display data describing area R1 on the location and details of the shop.

However, in the case where the capture button displayed on the Web page is not clicked, the point information of the store described in the comment tag describing area R3 would not be read out by the CPU 52 normally but it is skipped.

Moreover, as the detailed content of the point information described in the comment tag describing area R3 is the same as shown in the normal Web page. Moreover, the map data regarding the latitude and longitude of the store described as "POSITION=127522880:502585147", and category of the store described as "CATEGORYCODE=1" (in this case, equivalent to "gourmet spot") are included.

Figure 13:
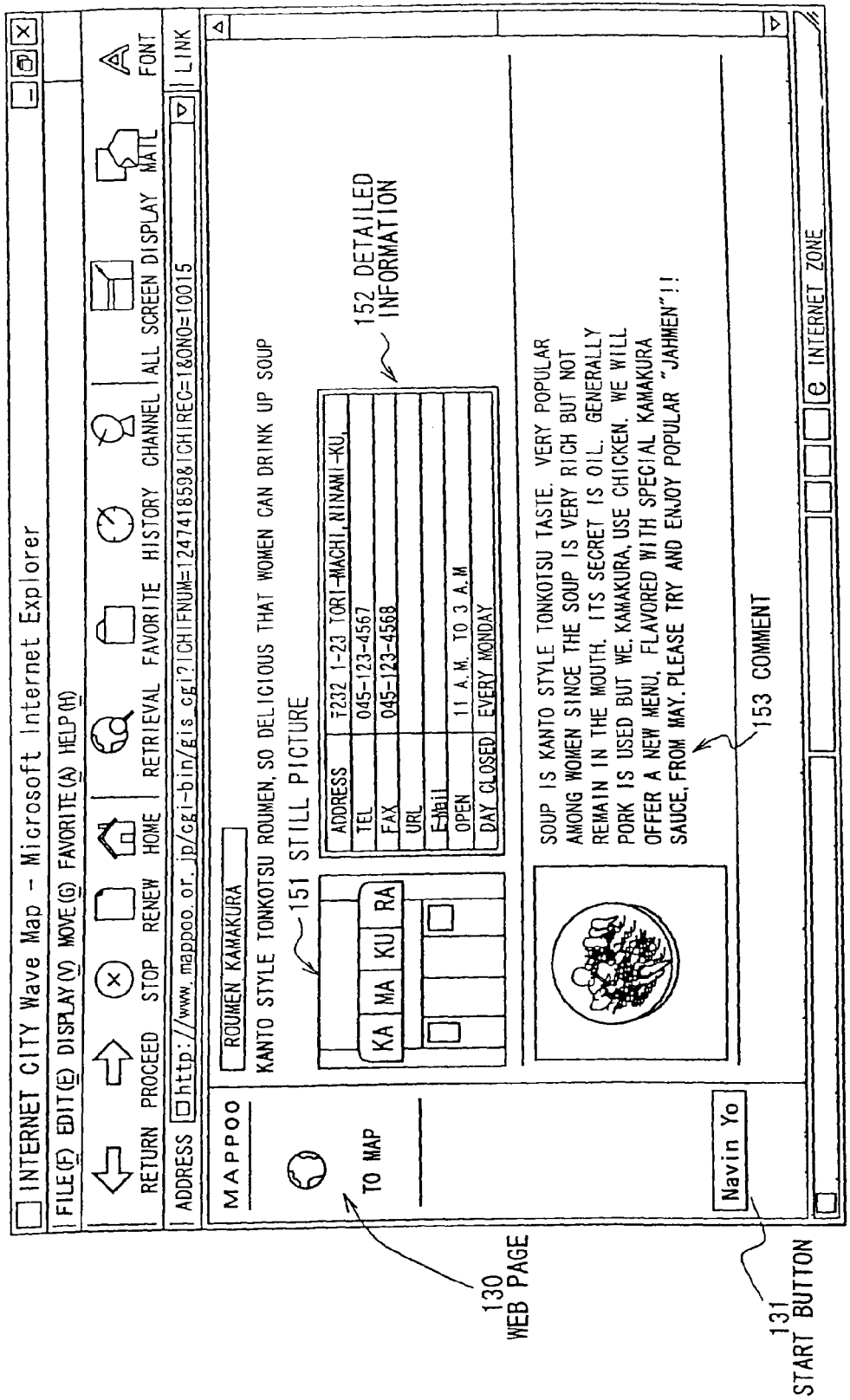
FIG. 13 is a brief linear diagram showing the display contents of the Web page.

In practice, when the HTML file of this data construction is transmitted from the WWW server 102 to the client 103 and analyzed by the WWW browser of the client 103, Web page as shown in FIG. 13 will be displayed on the liquid crystal display 21.

Web page 130 is detailed page of the store selected by the user from the detection result screen 128. A still picture 151 formed by the picture of the shop "Roumen Kamakura" selected, the detailed information 152 such as address, telephone number, FAX, service hour and day off, and comment of the shop 153 are displayed based on the display data of the display data describing area R1 and also the start button 131 of the auxiliary program is displayed on the predetermined area of the lower left part.

At this point, the auxiliary program is risen on the RAM 54 at the time point when the Web page 130 is displayed on the liquid crystal display 21.

In this Web page 130, in the case of registering the point information on the map screen 120 to be displayed by the digital map software 60B after the user confirms the detailed contents of the store, click the start button 131.

Thus, in the client 103, the CPU 52 reads out the point information of the store described in the comment tag describing area R3 based on the auxiliary program risen on the RAM 54 and hands over the point information to the digital map software 60B.

At this point, the CPU 52 rises a capture flag showing that it handed over the point information to the digital map software 60B. And by confirming the condition of capture flag even when the start button 131 is clicked again, it can prevent delivering the point information to the digital map software 60B again.

At the same time, the CPU 52 changes the color of the edge of start button 131 corresponding to the condition of capture flag. And when it rises a capture flag, the CPU 52 changes the color of the edge of start button 131 to red and displays this. Thus, the client 103, by changing the color to red and displaying the edge of the start button 131, makes the user recognize that the point information has been handed over to the digital map software 60B by clicking the start button 131.

Figure 14:
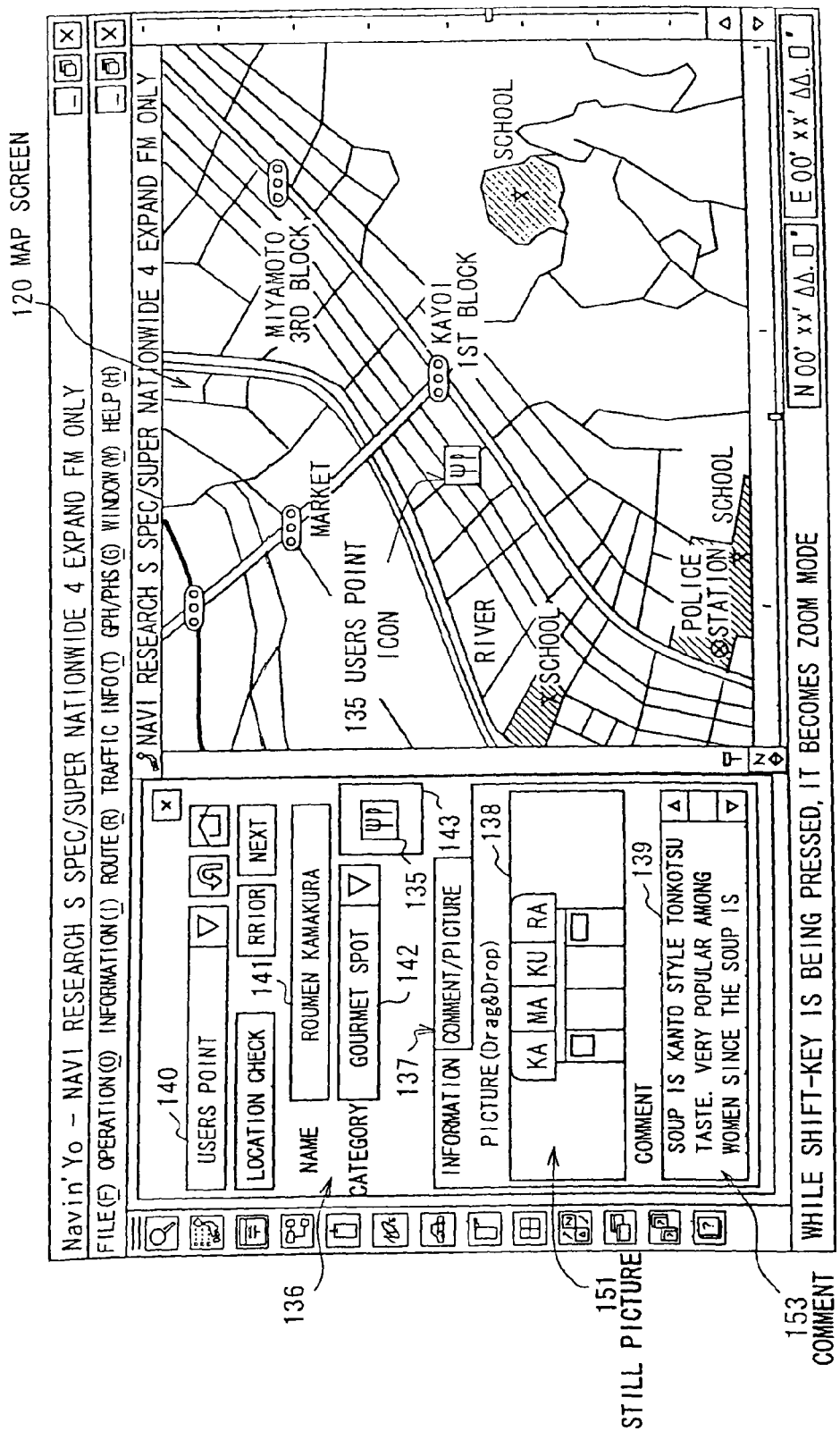
FIG. 14 is a brief linear diagram showing the point information of the Web page input on the map screen.

Then, as shown in FIG. 14, the client 103 displays the user point Icon 135 with the predetermined mark corresponding to the category code on the predetermined position of the map screen 120 based on the map data regarding the latitude and longitude of the shop described as "POSITION=127522830: 502585147" (FIG. 12) from the point information of the comment tag describing area R3 read out by the CPU 52 according to the auxiliary program. That is, in the map screen 120, the shop "Roumen Kamakura" exists on the position displayed by the user point Icon 135.

In this connection, the map data regarding the latitude and longitude are converted with the predetermined format displayable by the digital map software 60B, and these are different from the actual latitude and longitude data.

At the same time, the client 103 pasts and displays the still picture 151 formed by the shop photo of "Roumen Kamakura" onto the still picture display area 138 of "comment/picture" column 137 in the users point registration screen 136 displayed on the left side area of the map screen 120 based on the digital map software 60B according to the point information, and also displays the comment 153 from the shop on the comment column 139.

Furthermore, at this moment, the client 103 stores the point information read out from the comment tag describing area R3 into the hard disc drive 60 corresponding to the users point Icon 135.

With this arrangement, when the users point Icon 135 is clicked, the client 103 can read out the point information memorized corresponding to the users point Icon 135 based on the control of the CPU 52 and can display the users point registration screen 136 on which display picture 151 and comment 153 are pasted.

In this connection, in the users point registration screen 136, "users point" showing the position set by the user is automatically displayed on the command panel 140 and "Roumen Kamakura" showing the name of shop is automatically displayed on the title panel 141. And moreover, "gourmet spot" showing the category corresponding to the category code is automatically displayed on the category panel 142 and the users point Icon 135 formed of a picture of a knife and fork corresponding to "gourmet spot" of the category code is automatically displayed on the Icon display panel 143.

Figure 15:
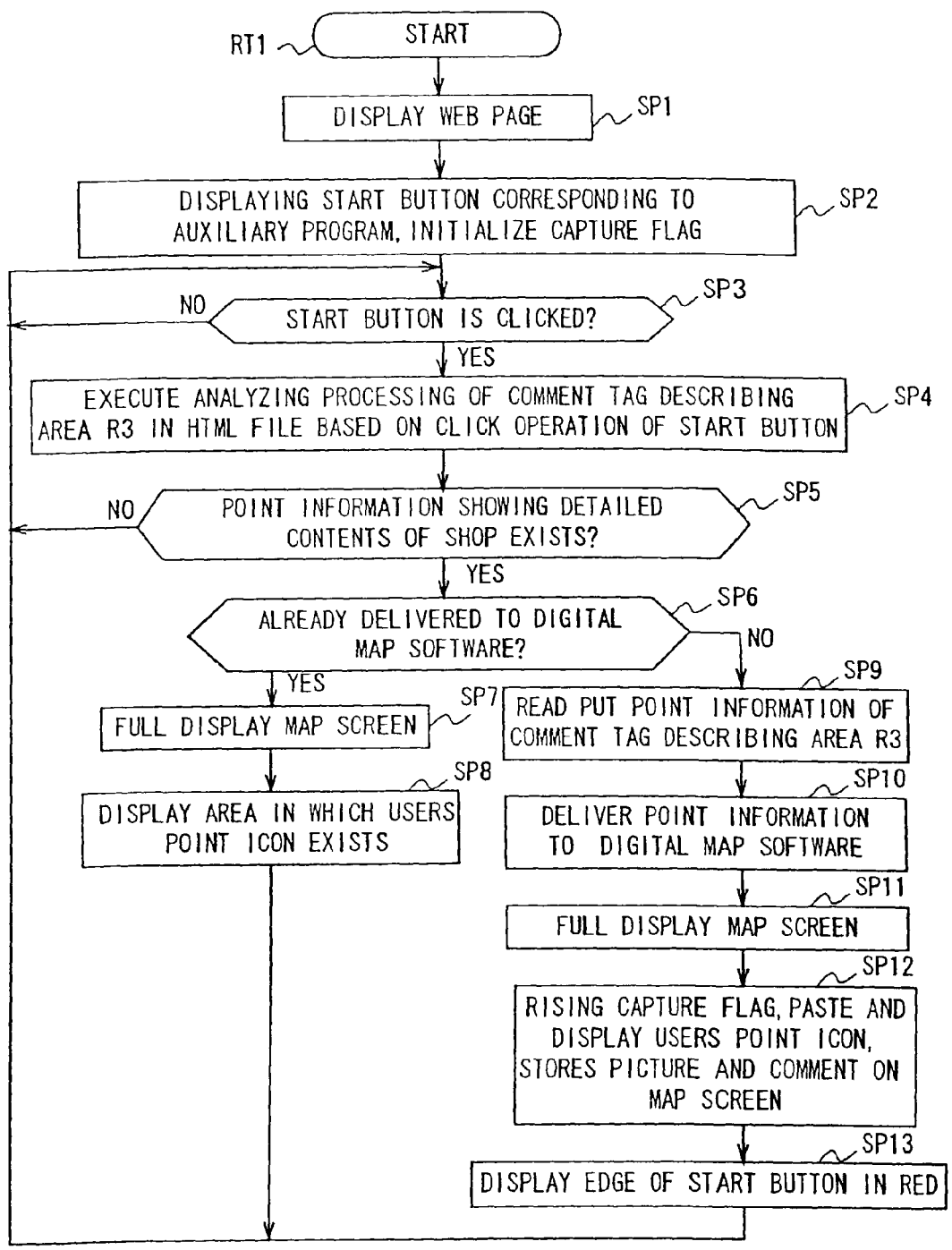
FIG. 15 is a flow chart showing the automatic capture processing procedure of the point information in the Web page.

Then next, the automatic capture processing procedure for registering the point information of the Web page displayed on the liquid crystal display 21 by the CPU 52 of the client 103 corresponding to the position on the map screen 120 displayed by the digital map software 60B will be explained in the following paragraphs referring to a flow chart of FIG. 15.

The CPU 52 of the client 103, entering from the start step of Rt 1, moves to the step SP1. At the step SP1, the CPU 52 displays Web page 130 showing the point information of the store selected by the user on the liquid crystal display 21 based on the display data described in the display data describing area R1 of HTML file, and moves to the following step SP2.

At the step SP2, the CPU 52, as well as displaying the start button 131 corresponding to the auxiliary program on the predetermined position of the Web page 130 based on the data described in the object tag describing area Rt2 of the HTML file, initializes the capture flag and moves to the following step SP3.

At the step SP3, the CPU 52 judges whether the start button 131 of the Web page 130 is clicked by the user or not. And if a negative result is obtained, this means that the start button 131 has not been clicked, and at this moment the CPU 52 returns to the step SP3 and waits till the start button 131 is clicked.

On the other hand, if an affirmative result is obtained at the step SP3, this means that the start button 131 is clicked by the user, and at this moment the CPI 52 proceeds to the following step SP4.

At the step SP4, the CPU 52 executes the analyzing processing onto the comment tag describing area R3 in the HTML file by clicking the start button 131 and moves to the step SP5.

At the step SP5, the CPU 52 judges whether detailed contents of the shop showing the point information is described in the comment tag describing area R3 or not. At this point, if a negative result is obtained, this means that the point information of the store is not described in the comment tag describing area R3 and at this moment the CPU 52 returns to the step SP3 and repeats the processing described above.

On the other hand, if an affirmative result is obtained, this shows that the point information of the store is described in the comment tag description area R3, and at this moment the CPU 52 moves to the following step SP6.

At the step SP4, the CPU 52 judges whether the point information showing detailed contents of the store described in the comment tag describing area R3 has been already handed over to the digital map software 60B or not based on the condition of capture flag. At this point, if an affirmative result is obtained, this shows that the point information has been already handed over to the digital map software 60B, and the CPU 52 proceeds to the following step SP7.

At the step SP7, the CPU 52 executes the processing to display the map screen 120 according to the digital map software 60B on the front screen of the liquid crystal display 21 and moves to the following step SP8.

At the step SP8, the CPU 52 displays the map screen 12 of the area part on which the users point Icon 135 is registered and returns to the step SP3.

On the other hand, if a negative result is obtained at the step SP6, this shows that the capture flag is not risen and the point information showing detailed contents of the store has not been handed to the digital map software 60B, and at this moment, the CPU 52 moves to the following step SP9.

At the step SP9, the CPU 52 reads out the point information described in the comment tag describing area R3 according to the supplemental program and moves to the following step SP10.

At the step SP10, the CPU 52 delivers the point information read out from the comment tag describing area R3 to the digital map software 60B and moves to the following step SP11.

At the step SP11, the CPU 52 executes the processing to display the map screen 120 by the digital map software 60B on the top screen of the liquid crystal display 21 and moves to the next step SP12.

At the step SP12, the CPU 52 rises a capture flag since it delivered the point information to the digital map software 60B, and displays the users point Icon 135 on the position on the map screen 120 according to the latitude and longitude from the point information. And the CPU 52, as well as pasting and displaying the still picture formed by the picture of shop on the still picture display area 138 in the users point registration screen 136, displays the comment 153 of the shop on the comment column 139, and moves to the following step SP13. At this point, the CPU 52 stores the point information in the hard disc drive 60 corresponding to the users point Icon 135.

At the step SP13, the CPU 52 delivers the point information read out from the comment tag describing area R3 to the digital map software 60B. And since the registration processing of the users point Icon 135 is terminated, the CPU 52 after displaying the edge of the start button 131 in red, moves to the step SP3 and terminates the processing.

(5) Operation and Effects of the Embodiment

According to the foregoing construction, when Number 2 anchor (Roumen kamakura) is clicked from the detection result screen 128 (FIG. 11), the client 103 outputs a transfer request of the Web page 130 showing detailed contents of the shop clicked to the WWW server 102.

Upon receipt of the transfer request from the client 103, the WWW server 102 reads out point information file of the shop specified from the point information file database 109 from that point and describing display data for displaying the Web page 130 onto the display data describing area R1, describes data for starting the auxiliary program and for displaying the start button 131 on the Web page 130. And by describing the point information to be read out by the CPU 52 of the client 103 according to the auxiliary program into the comment tag describing area R3, the WWW server 102 forms HTML file and transmits this to the client 103 which sent the transfer request.

Thus, the WWW server 102 forms the HTML file actively from the time point when it receives the transfer request from the client 103. However, since the WWW server 102 describes the point information having the same contends as the display data described in the display data describing area R1 into the comment tag describing area R3 by using the HTML tag, the HTML file can be formed easily and simply and at the same time, it becomes unnecessary to form and store the point information file, the workload for the server will be decreased.

The client 103, by receiving and analyzing the HTML file by the WWW browser, displays Web page 130 showing detailed contents of the shop requested the transmission to the liquid crystal display 21.

When the start button 131 on the Web page 130 is clicked by the user, the CPU 52 reads out point information described in the comment tag describing area R3 according to the auxiliary program and the client 103 delivers this to the digital map software 60B.

In the HTML file received by the client 103, the point information to be delivered to the digital map software 60B is described in the comment tag describing area R3 in advance, and the point information of the comment tag describing area R3 will be read out immediately according to the clip operation of the start button 131.

Thus, the client 103 can read out the point information from the comment tag describing area R3 of HTML file according to the click operation of the start button 131 without downloading the point information and can deliver the point information to the map software 60B in real time.

With the above arrangement, the client 103 displays the users point Icon 135 on the predetermined position on the map screen 120 based on the map data of point information, and pasting a still picture 151 of the shop picture onto the still picture display area 138 on the users point register screen 136, displays comments 153 from the shop in the comment column 139.

At the same time, the client 103 stores the point information read out from the comment tag describing area R3 in the hard disc drive 60 corresponding to the users point Icon 135.

In this connection, since the client 103 reads out the point information described in the comment tag describing area R3 and rises the capture flag when it is handed over to the digital map software 60B, the point information is prevented from being redelivered to the digital map software 60B when the start button 131 is re-clicked.

Furthermore, since the client 103 displays the edge of the start button 131 changing its color to red when it delivers the point information read out from the comment tag describing area R3 to the digital map software 60B, it makes the user recognize that the start button 131 is clicked and delivery of the point information has been conducted already.

According to the foregoing construction, since the point information receiving system 100 transmits the HTML file formed by describing the point information into the comment tag describing area R3 by the WWW server 102 to the client 103 and analyzes the HTML file received by the client 103 using the WWW browser, and reading out the point information described in the comment tag describing area R3 according to the auxiliary program, delivers this to the digital map software 60B, and as well as executing the predetermined processing according to the digital map software 60B, stores the point information in the hard disc drive 60; thus, the point information displayed on the Web page can be automatically captured and registered onto the predetermined position on the map screen 120 to be displayed by the digital map software 60B according to the click operation of the start button 131.

(6) Other Embodiments

The embodiment described above has dealt with the case of reading out the point information showing detailed contents of the shop described in the comment tag describing area R3 according to the auxiliary program when the start button 131 of the Web page is clicked by the CPU 52 of the client 103 and delivering this to the digital map software 60B and registering the users point Icon 135 on the map screen 120. However, the present invention is not only limited to this but also when the start button 131 of the Web page is clicked, the point information described in the comment tag describing area R3 may be delivered to the digital map software 60B and set as the target value when conducting the route searching. In short, if the point information described in the comment tag describing area R3 can be delivered to the digital map software 60B when the start button 131 of the Web page is clicked, various other processings corresponding to the digital map software 60B may be conducted. In such cases, the same effects as those of the above can be obtained.

Furthermore, the embodiment described above has dealt with the case of utilizing ActiveX control as the auxiliary program. However, the present invention is not only limited to this but also if the auxiliary program that can conduct the processing, that is difficult to be executed in the HTML, on the WWW browser, various other auxiliary programs such as Java may be used as the auxiliary program.

Furthermore, the embodiment described above has dealt with the case of delivering the point information showing detailed contents of the shop described in the comment tag describing area R3 to the digital map software 60B based on the click operation of the start button 131. However, the present invention is not only limited to this but also music word data described in the comment tag describing area R3 may be delivered to the predetermined application based on the click operation of the start button 131 for example.

Moreover, the embodiment described above has dealt with the case of reading out the auxiliary program according to the class ID specified at the object tag describing area R2 from the hard disc drive 60 and reading out the point information of the comment tag describing area R3 by the CPU 52 according to the auxiliary program. However, the present invention is not only limited to this but also the auxiliary program may be downloaded from the WWW server 102 via the Internet based on the class ID specified at the object tag describing area R2 and the point information of the comment tag describing area R3 may be read out according to the auxiliary program.

Furthermore, the embodiment described above has dealt with the case of constructing the CPU 106 as the providing information forming means for forming HTML file as the provide information by describing point information as the comment data with the format that the client 103 can read out in the comment tag describing area R3 as the comment area according to the HTML file forming program as the program of the provider side, and the WWW server 102 as the information forming means by the interface 105 and router as the transmitting means for transmitting HTML file to the client 103 as the information processing device. However, the present invention is not only limited to this but also the information providing device may be constructed by various other information forming means and transmission means and various other comment data other than the point information may be transmitted to the information processing device.

Furthermore, the embodiment described above has dealt with the case of forming the client 103 as the information processing device by the modem 66 as the receiving means for receiving the HTML file as the providing information formed by describing the point information as the comment data with the format that the client 103 can read out into the comment tag describing area R3 as the comment area set by the HTML via the Internet as the network, the CPU 52 and RAM 54 as the analyzing means for analyzing the HTML file received according to the WWW browser and auxiliary program as the analyzing program and reading out the point information of the comment tag describing area R3 and the CPU 52 as the control means for delivering the point information to the digital map software 60B as the application software and conducting the predetermined registration processing according to the digital map software 60B. However, the present invention is not only limited to this but also the information processing device may be constructed by various other receiving means, analyzing means and control means. And various other comment data other than point information may be read out and delivered to various other application softwares and the predetermined processing may be conducted.

Moreover, the embodiment described above has dealt with the case where the HTML file forming program as the program of provider side is read out from the hard disc of the hard disc drive 107 as the information providing method recording medium in the WWW server 102 and is provided. However, the present invention is not only limited to this but also these may be provided by means of package media such as compact disc-read only memory (CD-ROM), digital versatile disc (DVD), semiconductor memory and magnetic disc to be stored temporarily or permanently, local area network, Internet and cabled and wireless communication media, such as digital satellite broadcasting. And moreover, these may be provided by other communication interface, such as router and modem.

Furthermore, the embodiment described above has described the case where the WWW browser and auxiliary program are read out from the hard disc of the hard disc drive 60 as the information processing method recording medium in the client 103 and provided. However, the present invention is not only limited to this but also these may be provided by the package media, such as compact disc-Read only memory (CD-ROM) and digital versatile disc (DVD), semiconductor memory and magnetic disc to be stored temporarily or permanently, local area network, Internet, cabled or wireless communication media such as digital satellite broadcasting. And moreover, these may be provided by other communication interface such as router and modem.

According to the present invention as described above, since providing information formed by describing the comment data readable by the information processing device in the comment area is transmitted from the information providing device to the information processing device, the providing information received by the information processing device is analyzed according to the predetermined analyzing program, and the comment data described in the comment area is read out and delivered to the predetermined application software, and the predetermined information processing is to be conducted according to the application software, the comment data can be obtained immediately only by reading out the comment data of the comment area described by the information providing device in advance from the providing information received at the information processing device without downloading from the information providing device and can be captured into the predetermined application software. And thereby, the information receiving system and information receiving method capable of receiving the provide information more easily via network can be realized.

Furthermore, according to the present invention, by forming the provide information by describing comment data with the format readable by the information processing device into the comment area set by the predetermined format and by transmitting the information to the information processing device via network, the comment data can be immediately obtained only by reading out the comment data of the comment area described in advance by the information providing device from the provide information received at the information processing device without downloading from the information providing device. And thus, an information providing device and information providing method capable of conducting the reception of provide information more easily via network can be obtained.

Furthermore, according to the present invention, by forming the provide information by describing the comment data with the format that the information processing device can read in the comment area set with the predetermined format, and transmitting the provide information to the information processing device via network, the information processing device can immediately obtain the comment data and can input into the predetermined application software only by reading out the comment data of the comment area described by the information providing device from the provide information received without downloading from the information providing device. And thereby, the information providing method providing medium capable of conducting the reception of provide information via network more easily can be realized.

Moreover, according to the present invention, since provide information in which comment data having the readable format is described on the comment area set with the predetermined format is received from the information providing device, the comment data of the comment area is read out from the provide information received and delivered to the predetermined application software, and the predetermined information processing will be conducted according to the application software, the comment data can be obtained immediately and put into the predetermined application software just by reading out the comment data of the comment area described by the information providing device in advance from the provide information received not downloading from the information providing device. And thus, an information processing device and information processing method capable of conducting the reception of provide information more easily via network can be realized.

Furthermore, according to the present invention, since the information processing device receives the provide information formed by describing the comment data with the readable format in the comment area set with the predetermined format according to the program memorized in the information processing method providing medium and analyzes this according to the predetermined program, and reading out the comment data described in the comment area, hands it over to the predetermined application software and conducts the predetermined information processing according to the application software, the comment data can be obtained immediately and can be put into the predetermined application software just by reading out the comment data of the comment area described by the information providing device in advance from the provide information received without downloading from the information providing device. And thereby, an information processing method providing medium capable of receiving the provide information via the network more easily can be realized.

While there has been described in connection with preferred embodiments of the invention, it will be obvious to those skilled in the art that various changes and modifications may be aimed, therefore, to cover in the appended claims all such changes and modifications as fall within the true spirit and scope of the invention.

The invention claimed is:

1. An information receiving system, comprising:
    an information providing device configured to provide information formed with a predetermined format responding to a transfer request; and
    an information processing device configured to conduct information processing upon receiving said provide information transmitted from said information providing device via a predetermined network, wherein said information providing device comprises
        a receiver configured to receive information including location information of a destination, icon information that is selected from plural kinds of icons corresponding to a category of the destination, and comment data describing the destination from said information processing device;
        a provide information forming unit configured to form said provide information including the location information, the icon information, and the comment data received from said receiver and having a readable format that the information processing device can read, the comment data being formed in a comment area set with said readable format according to a predetermined program; and
        a transmitter configured to transmit said provide information formed by said provide information forming unit to said information processing device via said network; and
    said information processing device comprises
        a receiver configured to receive said provide information transmitted via said network;
        an analyzer configured to analyze said provide information received by said receiver according to a predetermined analyzing program and to read out said comment data formed in said comment area;
        a controller configured to deliver said comment data read out by said analyzer to predetermined application software and conduct the information processing according to said predetermined application software; and
        a display configured to display, in a first window, a map including an icon image corresponding to the icon information on a position corresponding to the location information and to display, in a second window, different from the first window and not including a map, the comment data describing the destination, wherein the second window is displayed adjacent to, but not overlapping, the first window in which the map is displayed.

2. The information receiving system according to claim 1, wherein said provide information is formed of a hyper text markup language file formed by a predetermined markup language.

3. The information receiving system according to claim 1, wherein said provide information forming unit of said information providing device is configured to form said provide information at a same time when said information providing device receives said transfer request from said information processing device.

4. A method, comprising:
    receiving, by an information providing device, information including location information of a destination, icon information that is selected from plural kinds of icons corresponding to a category of the destination, and comment data describing the destination from an information processing device;

forming said provide information including the location information, the icon information, and the comment data received in the receiving step and having a readable format that the information processing device can read, the comment data being formed in a comment area set with said readable format according to a predetermined program;

transmitting the formed provide information to said information processing device via a predetermined network;

receiving, by the information processing device, said provide information transmitted via said network;

analyzing said received provide information according to a predetermined analyzing program and reading out said comment data from said comment area;

delivering said comment data read out by in the analyzing step to predetermined application software and conducting information processing according to said predetermined application software; and displaying, in a first window, a map including an icon image corresponding to the icon information on a position corresponding to the location information and displaying, in a second window, different from the first window and not including a map, the comment data describing the destination, wherein the second window is displayed adjacent to, but not overlapping, the first window in which the map is displayed.

5. The method of claim 4, wherein said provide information is formed of a hyper text markup language file formed by a predetermined markup language.

6. The method of claim 4, wherein the forming step comprises forming said provide information at a same time when said information providing device receives a transfer request from said information processing device.

7. An information providing device, forming part of an information receiving system, said information providing device comprising:
   a receiver configured to receive information including location information of a destination, icon information which is selected from plural kinds of icons corresponding to a category of the destination, and comment data describing the destination from an information processing device;
   a provide information forming unit configured to form provide information including the location information, the icon information, and the comment data received from said receiver and having a readable predetermined format that the information processing device can read, the comment data being formed in a comment area set with said readable format according to a predetermined program, responding to a transfer request; and
   a transmitter configured to transmit said provide information formed by said provide information forming unit to said information processing device via a predetermined network,
   wherein the information receiving system includes
      a receiver configured to receive said provide information transmitted via said network;
      an analyzer configured to analyze said provide information received by said receiver according to a predetermined analyzing program and to read out said comment data described said comment area;
      a controller configured to deliver said comment data read out by said analyzer to predetermined application software and conduct the information processing according to said predetermined application software; and
      a display controller configured to display, in a first window, a map including an icon image corresponding to the icon information on a position corresponding to the location information and to display, in a second window, different from the first window and not including a map, the comment data describing the destination, wherein the second window is displayed adjacent to, but not overlapping, the first window in which the map is displayed.

8. The information providing device of claim 7, wherein said provide information is formed of a hyper text markup language file formed by a predetermined markup language.

9. The information providing device of claim 7, wherein said provide information forming unit is configured to form said provide information at a same time when said information providing device receives said transfer request from said information processing device.

10. A method, comprising:
   receiving, from an information processing device by an information providing device, information including location information of a destination, icon information that is selected from plural kinds of icons corresponding to a category of the destination, and comment data describing the destination;
   forming, in response to a transfer request, provide information including the received location information, the icon information, and the comment data and having a readable predetermined format that the information processing device can read, the comment data being formed in a comment area set with said readable format according to a predetermined program; and
   transmitting said formed provide information to said information processing device via a predetermined network,
   the information providing device forming part of an information receiving system, the system including the information processing device, which is configured to perform the step of displaying, in a first window, a map including an icon image corresponding to the icon information on a position corresponding to the location information and displaying, in a second window, different from the first window and not including a map, the comment data describing the destination, wherein the second window is displayed adjacent to, but not overlapping, the first window in which the map is displayed.

11. The method of claim 10, wherein said provide information is formed of a hyper text markup language file formed by a predetermined markup language.

12. The method of claim 10, wherein said provide information forming unit is configured to form said provide information at a same time when said information providing device receives said transfer request from said information processing device.

13. An information processing device, forming part of an information receiving system, said information processing device comprising:
   a transmitter configured to transmit information including location information of a destination, icon information that is selected from plural kinds of icons corresponding to a category of the destination, and comment data describing the destination to an information providing device and to transmit a transfer request via a predetermined network;
   a receiver configured to receive provide information including the location information, the icon information, and the comment data transmitted from said information providing device and having a readable predetermined format that the information processing device can read, the comment data being formed in a comment area set with said readable format according to a predetermined program, responding to the transfer request transmitted via the network;

an analyzer configured to analyze said provide information received by said receiver according to a predetermined analyzing program and to read out said comment data from said comment area;

a controller configured to deliver said comment data read out by said analyzer to predetermined application software and conduct information processing according to said predetermined application software; and a display controller configured to display, in a first window, a map including an icon image corresponding to the icon information on a position corresponding to the location information, and to display, in a second window, different from the first window and not including a map, the comment data describing the destination, wherein the second window is displayed adjacent to, but not overlapping, the first window in which the map is displayed, wherein the information receiving system includes
a receiver configured to receive information including the location information of the destination, the icon information, and the comment data from said information processing device;

a provide information forming unit configured to form said provide information responding to said transfer request; and a transmitter configured to transmit said provide information formed by said provide information forming unit to said information processing device via said predetermined network.

14. The information processing device of claim 13, wherein said provide information is formed of a hyper text markup language file formed by a predetermined markup language.

15. The information processing device of claim 13, wherein said provide information forming unit is configured to form said provide information at a same time when said information providing device receives said transfer request from said information processing device.

16. An information processing method, comprising:
transmitting, by an information processing device, information including location information of a destination, icon information that is selected from plural kinds of icons corresponding to a category of the destination, and comment data describing the destination to an information providing device and to transmit a transfer request via a predetermined network;

receiving provide information including the transmitted location information, the icon information, and the comment data, which have a readable predetermined format that the information processing device can read, the comment data being formed in a comment area set with said readable format according to a predetermined program, responding to the transfer request transmitted via the network;

analyzing said received provide information according to a predetermined analyzing program and reading out said comment data from said comment area;

delivering said comment data read out in the analyzing step to predetermined application software and conducting information processing according to said predetermined application software; and displaying, in a first window, a map including an icon image corresponding to the icon information on a position corresponding to the location information, and displaying, in a second window, different from the first window and not including a map, the comment data describing the destination, wherein the second window is displayed adjacent to, but not overlapping, the first window in which the map is displayed.

17. The method of claim 16, wherein said provide information is formed of a hyper text markup language file formed by a predetermined markup language.

18. The method of claim 16, wherein said provide information is formed at a same time when said information providing device receives said transfer request from said information processing device.

* * * * *